(No Model.)

T. WOODASON.
BELLOWS ATTACHMENT FOR INSECT POWDER, &c.

No. 292,085. Patented Jan. 15, 1884.

Witnesses —
Louis F. Gardner
J. W. Garner

Inventor —
Thos. Woodason
per
J. A. Lehmann,
Atty.

United States Patent Office.

THOMAS WOODASON, OF CHICAGO, ILLINOIS.

BELLOWS ATTACHMENT FOR INSECT-POWDER, &c.

SPECIFICATION forming part of Letters Patent No. 292,085, dated January 15, 1884.

Application filed June 20, 1883. (No model.)

*To all whom it may concern:*

Be it known that I, THOMAS WOODASON, of Chicago, in the county of Cook and State of Illinois, have invented certain new and useful Improvements in Bellows Attachments for Insect-Powder, &c.; and I do hereby declare the following to be a full, clear, and exact description of the invention, such as will enable others skilled in the art to which it pertains to make and use it, reference being had to the accompanying drawings, which form part of this specification.

My invention relates to an improvement in bellows attachments for insect-powder, &c.; and it consists in the combination of a pipe which is connected directly with the bellows, and which has a perforated end, a chamber in which the powder or other substance is to be placed, and which chamber is connected both to the bellows-pipe and to the outlet-pipe, and a small pipe which is attached to the outlet-pipe and has no connection with the pipe which is connected to the bellows, as will be more fully described hereinafter.

The object of my invention is to cause the air which is forced from the bellows to be discharged directly into the receptacle or chamber in which the powder is placed and thus create a dust, or to cause the powder to rise in small clouds and thus be forced out in small regulated quantities instead of in jets of uncertain quantities, as is the case where the chamber is placed upon the top of the outlet-pipe in the usual manner.

Figure 1:
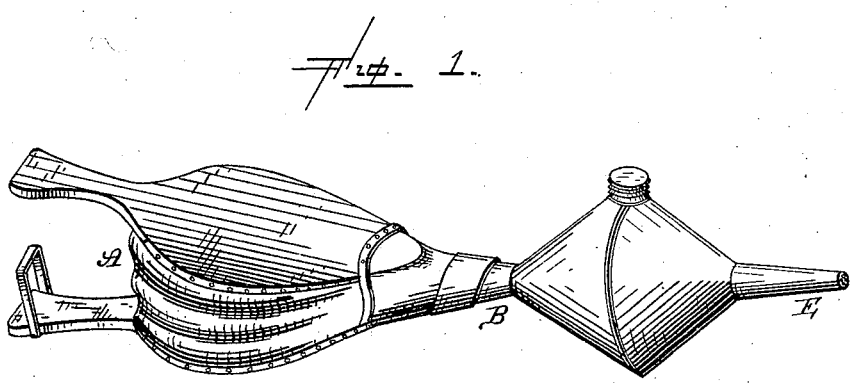
Figure 2:
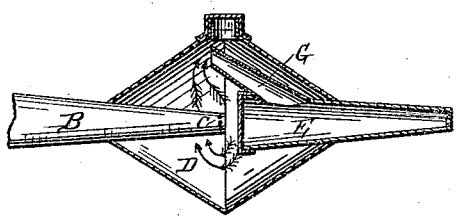

Figure 1 is a perspective of a bellows embodying my invention. Fig. 2 is a vertical central section of the attachment to the bellows by itself.

A represents a bellows of any suitable shape, size, or construction, and B the pipe which is connected directly to its front end, and through which all of the air that is forced from the bellows is made to pass. The outer end of this pipe, instead of being open so that air can pass directly through, is here closed, and near the end are made a series of small perforations, C, through which the air passes into the receptacle or chamber D. This chamber D will be of any desired shape, size, or construction, and be secured directly to the bellows-pipe B and the outlet-pipe E, as shown. Upon the top of this chamber is made a suitable opening which is closed by a screw-cap, and through which powder or other substance is inserted. The outlet-pipe E has its inner end closed and its outer end provided, preferably, with small perforations, as shown in Fig. 1, and is held in place by means of the receptacle to which it is rigidly secured. A suitable space is left between the ends of the two pipes B E, as shown, and both ends being closed it will be seen that there is no direct connection between the two. Extending upward from the outlet-pipe E into the top of the receptacle is a small pipe, G, through which the air which is forced from the bellows passes into the outlet-pipe, carrying with it the dust which was made by the forcible entry of the air into the receptacle. As the air is forced in different directions from the pipe B, it comes in direct contact with the powder which is placed in the receptacle, and this powder is carried off with the air through the small pipe into the outlet-pipe in fine jets or sprays, and in just large enough quantities to effect the desired result without any waste.

Where the powder-receptacle is placed above the outlet-pipe and connected directly thereto, the powder is blown out in such large quantities that a greater or less waste always occurs. In order to prevent this useless waste, I make use of two outlet-pipes which have their ends disconnected inside of the receptacle, as shown and described.

Having thus described my invention, I claim—

1. In a bellows attachment, the combination of the bellows-pipe B, an outlet-pipe, E, the chamber D, having an opening through its top, and which serves to connect the two pipes B E together, and a pipe, G, which is connected to the outlet-pipe E, and which extends upward from the outlet-pipe into the top of the chamber D, substantially as shown.

2. In the combination of a bellows-pipe, B, provided with a series of perforations near its closed end, the powder-receptacle, the outlet-pipe E, which is supported in position by means of the receptacle, and the small pipe connected with the outlet-pipe, substantially as set forth.

In testimony whereof I affix my signature in presence of two witnesses.

THOMAS WOODASON.

Witnesses:
  A. B. TALLMAN,
  THOMAS J. MCGRATH.